July 24, 1956  D. W. RUEDEMANN  2,755,770
SELF FEEDER SILO
Filed April 23, 1953  4 Sheets-Sheet 1
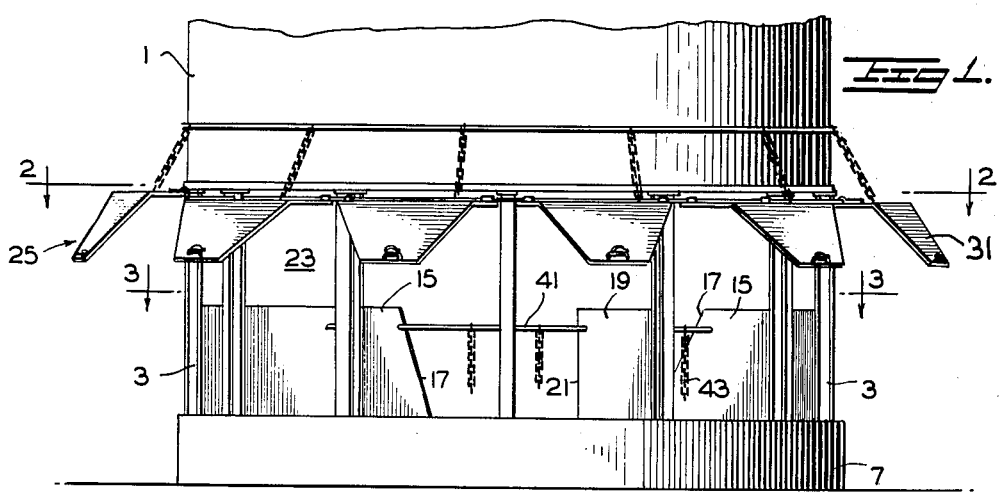
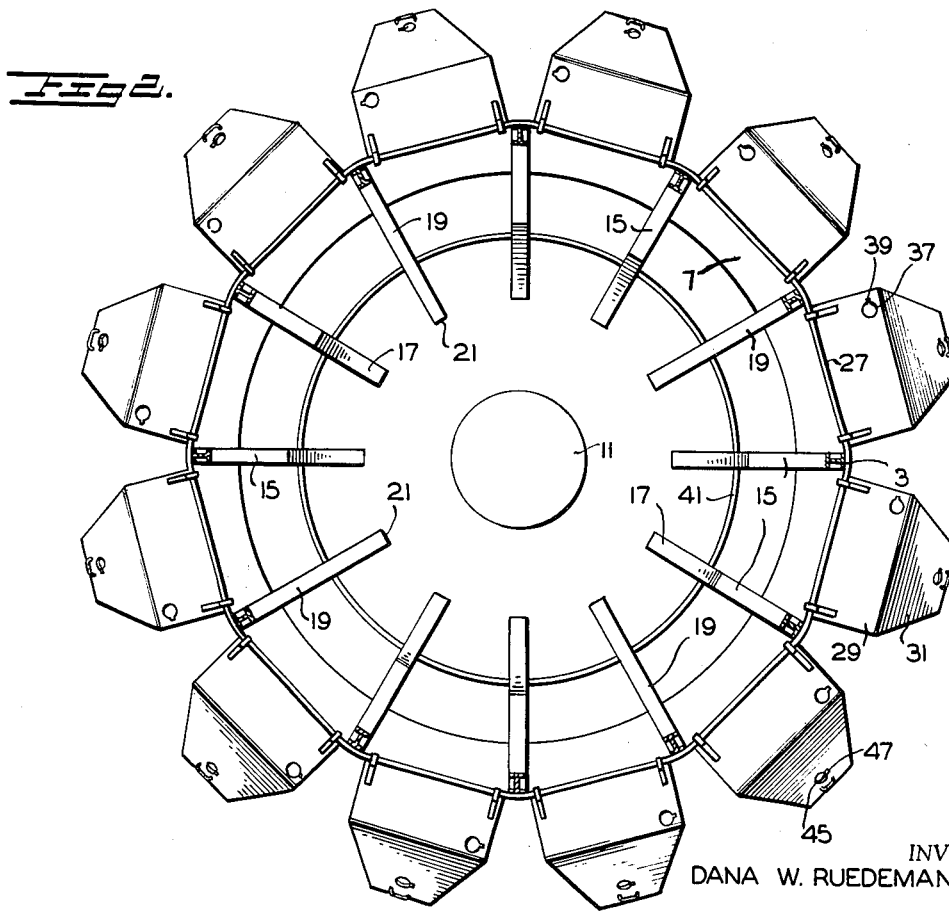
INVENTOR
DANA W. RUEDEMANN
BY Peck & Peck
ATTORNEYS July 24, 1956 D. W. RUEDEMANN 2,755,770
SELF FEEDER SILO
Filed April 23, 1953 4 Sheets-Sheet 2
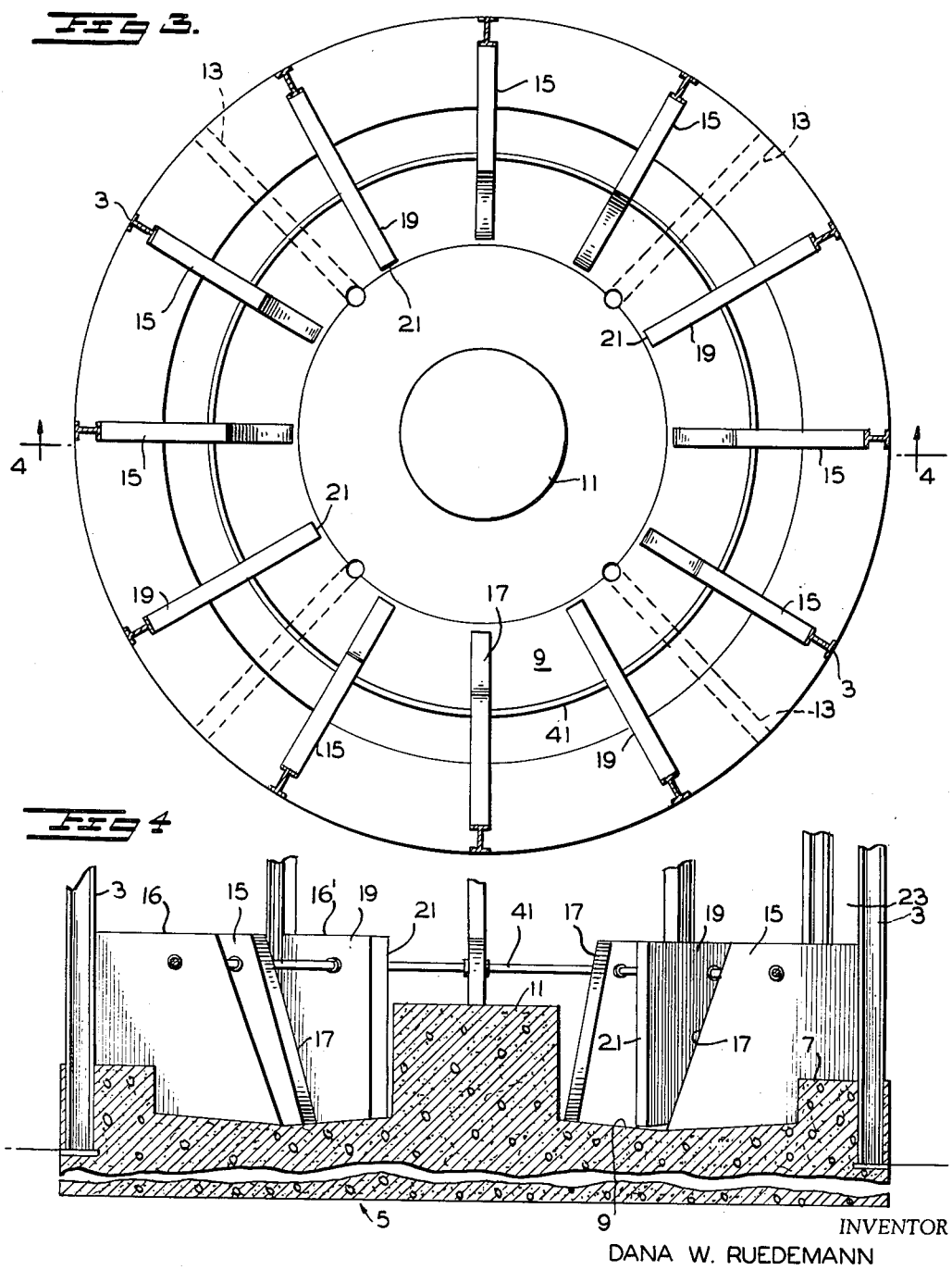
INVENTOR
DANA W. RUEDEMANN
BY Peck & Peck
ATTORNEYS

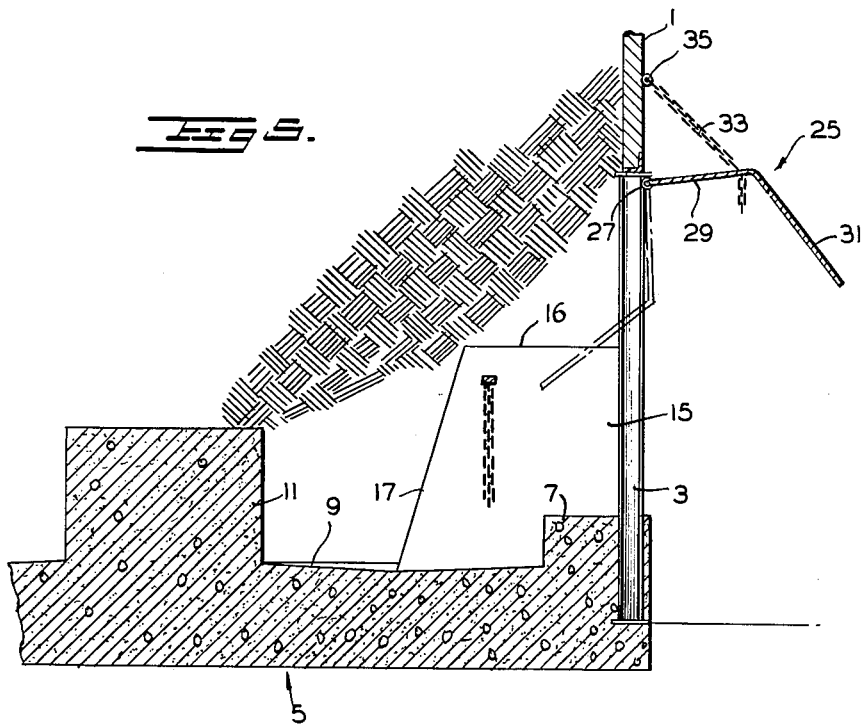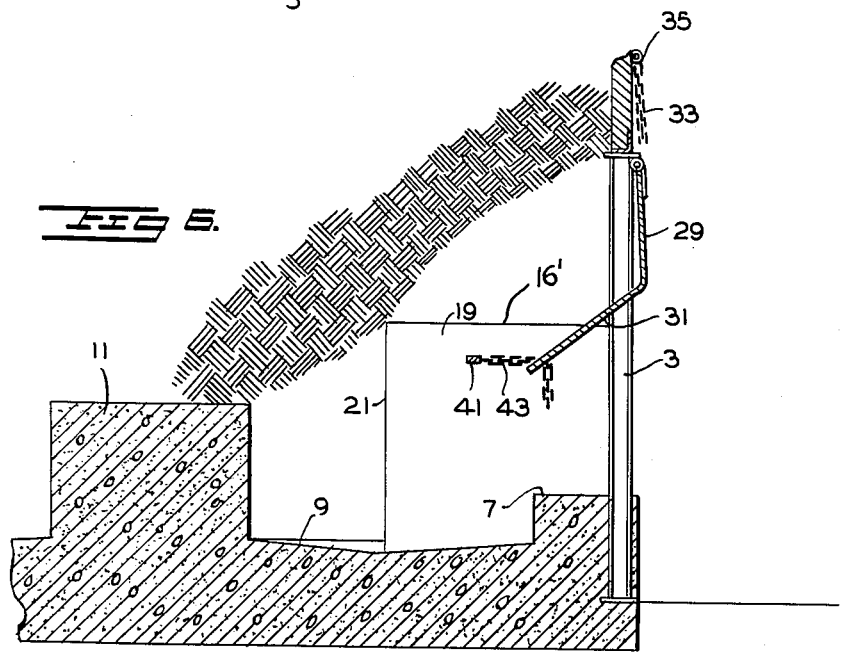

July 24, 1956
D. W. RUEDEMANN
2,755,770
SELF FEEDER SILO
Filed April 23, 1953
4 Sheets-Sheet 4
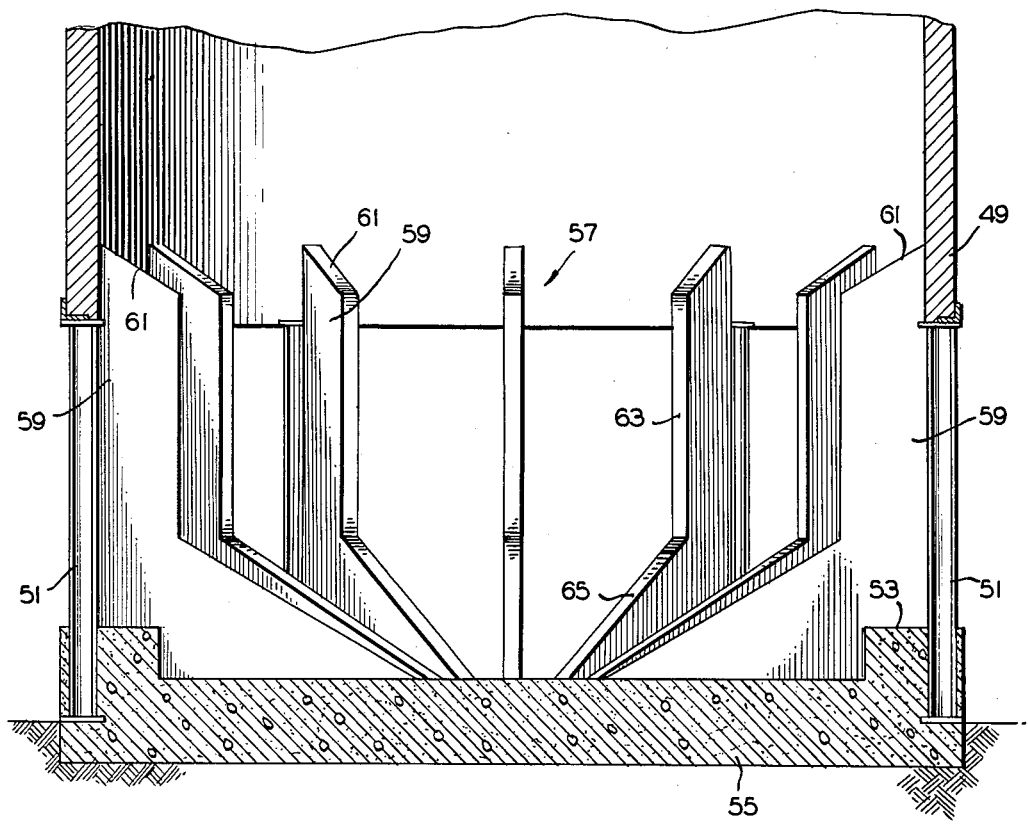
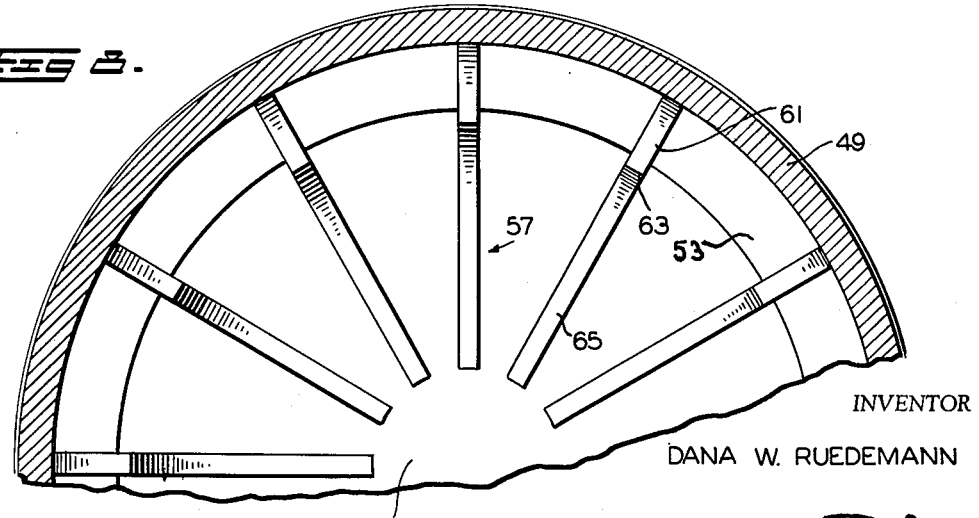
INVENTOR
DANA W. RUEDEMANN
BY
Peck & Peck
ATTORNEYS

United States Patent Office 2,755,770
Patented July 24, 1956

2,755,770

SELF FEEDER SILO

Dana W. Ruedemann, Plainsboro, N. J.

Application April 23, 1953, Serial No. 350,743

7 Claims. (Cl. 119—52)

This invention relates broadly to the art of silos, and in its more specific aspects it relates to a cylindrical silo having self feeding characteristics so that the manual labor required in conventional systems of feeding cattle is substantially reduced; and the nature and objects of the invention will be readily recognized and understood by those skilled in the arts to which it relates in the light of the following explanation and detailed description of the accompanying drawings illustrating what I at present believe to be the preferred embodiments or mechanical expressions of my invention from among various other forms, arrangements, combinations and constructions, of which the invention is capable within the spirit and scope thereof.

One of the problems which have been encountered by workers and experimenters in the field of self feeder silos has been to develop a cylindrical silo which will self feed grass silage as well as corn silage. It has been found that grass silage when in a silo and under pressure compacts into a much stronger mass than corn silage, actually grass silage when subjected to the great pressures generated in a self feeder silo approaches the density and strength of certain types of building board, while corn silage remains somewhat granular even under the pressures encountered in self feeder silos. The compressed silage becomes so hard that the cattle cannot chew it off at the feeding stations about the base of the silo.

Cylindrical self-feeder silos are provided with a plurality of openings about the base thereof through which the silage is accessible to the cattle. In silos of this character many factors must be considered, for instance the silage must be readily accessible to the cattle, the cattle must be protected against a mass of silage falling on them, wastage of silage must be eliminated or controlled, means should be provided for controlling the feeding action of the cattle, and in order to reduce the manual labor required in the operation of a silo the cylindrical silo and self feeder components should be designed to assure the flow of silage downwardly within the silo to positions therein where the cattle can easily gain access to it and to prevent compacting of the silage mass so that it is soft enough for the cattle to eat it. It is probably this last factor or requirement which has been the most difficult of solution, particularly when grass silage is being fed due to its inherent compacting characteristic which causes it to become too hard for the cattle to chew or break off parts of the compacted mass. Obviously massing and packing of the silage within the silo requires manual labor to break up the mass of silage so it may soften and flow to the feeding stations about the silo base and it has been my purpose to evolve a cylindrical self feeder silo which reduces massing of the contained silage to a minimum to thereby reduce the manual labor required in the operation of the silo. It may be noted that experts in this art term a silo a "self feeder" if it stores and possibly processes forage with manual labor requirement of not more than 40 per cent of that necessary for feeding in the conventional manner. The silo of this invention substantially meets and betters this definition of a self feeder silo.

It has been discovered that as the cattle eat into the mass of contained silage the area of silage supporting the mass becomes smaller so that the unit pressure within this supporting column of silage becomes greater and it is this increase in pressure which so compacts and hardens the silage at the feeding stations that the cattle cannot chew it off. It has been one of my primary purposes to so support the mass of silage that the cattle can get to it and to upset the equilibrium of the silage to thereby reduce intense pressure areas at eating points so that the compacted mass will be broken up to permit eating by the cattle. It has been a further object of my invention to upset the equilibrium of the mass of contained silage so that pressures are created at certain points within reach of the operator who may then break up the mass at such points with a chain saw or other means so that the mass may be chewed off by the cattle. The supporting means which I have devised for the mass of silage is also designed to prevent the silage from being forced radially outwardly to such an extent that it would be wasted.

In actual operation of a self feeder silo of the type involved in this application I have found that the supporting means is so efficient in breaking up the silage at the feeding locations that it is not necessary to break up the silage with a chain saw or the like at frequent intervals, as a matter of fact these self feeder silos are approximately 80 per cent efficient in their operation.

With this novel supporting means for the silage I have combined means for controlling the eating action of the cattle and preventing wastage of the silage at the feeding stations.

Self feeder silos of the general type in which I am particularly interested usually consist of a cell or silo body which is mounted on a plurality of circumferentially spaced columns, the open areas between these columns constituting the feed openings or feeding stations for the cattle. The columns are mounted on a concrete or other stable supporting surface representing a floor or base for the entire organization.

The supporting means which I have devised for the mass of silage so that it may be accessible to the cattle is supported from the base and not from either the columns or from the cell or silo body itself. This is an advantageous feature of my design because it relieves the columns and the cell from many pressures, weights and stresses to which they might otherwise be subjected and which they might not be able to withstand. I have designed the silo in this manner even though this supporting means for the silage or at least a section thereof may extend upwardly into the area within the cell itself.

It is within my contemplation to provide support means for the body of silage which may provide support surfaces at different horizontal levels and also which may be at an inclination to the horizontal.

This invention is an improvement of the self feeder silo disclosed in my copending application Serial No. 199,872, filed December 8, 1950, and now Patent No. 2,638,871.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

Fig. 1 is a view in elevation of my self feeder silo with parts thereof broken away.

Fig. 2 is a view taken on line 2—2 of Fig. 1.

Fig. 3 is a view taken on line 3—3 of Fig. 1.

Fig. 4 is a section through the base of the silo taken on line 4—4 of Fig. 3.

Fig. 5 is a detail view in section illustrating one component of the silage supporting means.

Fig. 6 is a view similar to Fig. 5 illustrating another component of the silage supporting means.

Fig. 7 is a vertical section through a silo having a modified type of silage supporting walls therein.

Fig. 8 is a view in horizontal section of the silo illustrated in Fig. 7 with parts thereof broken away.

Referring to the accompanying drawings I have used the numeral 1 to designate a cylindrical cell type silo for storing forage for feeding to cattle. This silo may be of any type conventionally used and the example illustrated in the drawings is approximately fourteen to sixteen feet in diameter, although it is to be particularly understood that my self feeder is designed for use in any usual silo which may be from approximately ten to twenty feet in diameter.

The body 1 of the silo is mounted on and supported by a plurality of circumferentially spaced columns 3 which in the particular embodiment illustrated are of wide flange I beam form. The self feeder silo is provided with a concrete base structure designated in its entirety by the numeral 5, the base being of circular shape to conform generally to the shape of the silo. The base is provided with an annular peripheral curbing 7 in which the supporting columns 3 are set. In the particular example shown by way of explanation and not as a limitation the curbing may be approximately eleven inches in width. Radially inwardly of the curbing I provide a gutter or floor 9 and a concrete block or disc 11 of circular shape and substantial height is formed of concrete centrally of and concentric with respect to the circular series of columns 3. Drains 13 extend from the gutter to the exterior of the silo.

The supporting means for the mass of silage within the cell 1 consists of a plurality of walls, one of which extends radially inwardly a distance from each supporting column 3. The walls 15 are constructed of concrete or other material sufficiently strong to withstand the silage load and are laid on the curbing and the gutter and extend inwardly from the columns so that the base 5 carries the weight which is applied to the walls rather than the cell 1 or the columns 3. The walls 15 are preferably though not necessarily of substantially the same width as the columns and the upper horizontally extending silage supporting surfaces 16 thereof which are substantially flat extend radially inwardly of the silo approximately 30 inches and the inner edges 17 forming the inner ends of the walls 15 are inclined inwardly and downwardly so that at their bases the radial length of each wall 15 is approximately 42 inches. The radial walls 15 I have termed inclined face radial walls.

In the particular example illustrated in the drawings where the silo is of a size to require 12 supporting columns 3 I have made every third radial wall which I have designated by the numeral 19 of different construction from the radial walls 15. These walls 19 are formed with a vertical inner face 21 so that the top horizontally extending surface thereof is substantially equal in length to the length of the lower part of walls 15, i. e. substantially 42 inches. The top silage supporting surfaces 16' of the walls 19 are substantially flat.

It will be appreciated that in the example shown in the drawings the self feeder silo has twelve feeding stations, one between each column and each feeding station is separated by a pair of radial walls, either by two inclined face radial walls 15 or a wall 15 and a vertical face wall 19, and it will be further recognized that the innermost portion of any radial wall is radially outwardly spaced from the central block 11.

When the silo is filled with silage it will be supported on the top surfaces of the radial walls 15 and 19 and on the top of the central block 11. Since all of the walls 15 and 19 are of greater height than the central block 11 the lower area of the mass of silage will present an inclined surface raised and maintained above the floor or base of the silo so that it is readily accessible for eating by the cattle. Since the radial walls are of less height than the feeding station openings 23 it will be clearly apparent that the silage is supported in position so that the cattle may get to that area of silage above the radial walls.

By reference particularly to Figs. 5 and 6 of the drawings it will be seen that due to the different relative radial positions of the innermost ends of the top surfaces of the radial walls 15 and 19 and the main bearing or supporting points for the silage will not be the same all the way around the silo and the equilibrium of the mass will be broken up which will tend to prevent constant compacting of the silage so that the cattle cannot chew it off and it will also cause compacting pressures to be generated at points where they can be reached by the operator and broken up. This particular radial wall construction reduces the number of times the operator finds it necessary to break up the mass at points above the walls.

It is desirable to provide some means at each feeding station to control the feeding action of the eating animal and to prevent wastage of silage. I provide an angled baffle plate designated in general by the numeral 25, and this plate is hingedly mounted on a tie rod 27 which extends around the silo at the top of the feed openings 23. Each baffle plate includes a top portion 29 and a lower part 31 angularly extending therefrom. When the operator desires to let the animal eat in unrestrained fashion within a particular feeding station the baffle 25 is held in upwardly swung position by means of a chain 33 suspended from an eye 35, the chain extending through a hole 37 having a slot 39 in communication therewith, the chain being pulled into the slot in order to hold the baffle in upwardly swung position as shown in Fig. 5 of the drawings. When it is desired to make the animal eat downwardly the baffle is swung to and maintained in the position illustrated in Fig. 6 of the drawings. A metal rod 41 extends between each radial wall and a chain 43 is fixed to the rod and is adapted to extend through a hole 45 in the lower plate 31, the baffle being held in the position shown in Fig. 6 by threading the chain through a slot 47 which is in communication with hole 45.

When a cow is eating at a feeding station it will stand on the curb 7 and not in the gutter 9. This is advantageous because silage which may have fallen in the gutter will not be trod on by the cow.

While I have stated the dimensions of certain components of my self feeder silo it is to be understood that these are set forth merely as one example and not as a limitation for the dimensions of the parts may be varied dependent on conditions of use. It is to be particularly understood that the length, height and width of the walls may be varied from the example illustrated in drawings and still fall within the scope of this invention, and the angle of inclination of the inner edges of walls 15 may be varied without departing from my inventive concept.

I have used the term "radial" in this specification and in the claims in its generic sense to include walls which may extend from the curve of the silo at various angles relative thereto.

It will be recognized that the series of radial walls 15 and 19 not only function as a support for the silage but also serve as partitions separating adjacent feeding stations. It will also be understood that the walls hold the silage so that when necessary the operator may position a cutting implement such as a chain saw, maddox or axe at the silage to break up any compacted masses therein.

Referring to Figs. 7 and 8 wherein I have illustrated a modified form of my invention I have used the numeral 49 to designate a cylindrical silo cell which as in the case of the cell 1 in Figs. 1 through 6 may be formed of any suitable material used in the construction of silos. The cell 1 is adapted to be filled with and contain a mass of silage and is mounted on a plurality of circumferentially spaced columns 5 which in the particular embodiment illustrated are of wide flange I beam form. The columns 51 are set in a curbing 53 of circular shape which forms the periphery of a base 55. The curbing and base may be constructed of concrete or other material capable of providing a firm, stable and strong supporting base for the silo and its contained mass of silage. The base 55 may be inclined if desired for drainage purposes and any desired type of drain-off means may be used.

In this form of my invention, I provide a plurality of walls designated generally by the numeral 57 and I preferably provide one wall for each column 53, the walls extending radially inwardly a distance from the columns 51, and are mounted on and supported by the base 55 of the silo. Each wall 57 may include what I shall term a peripheral section 59 which extends upwardly from the base and the curbing to provide an upper silage supporting surface 61, which, as will be apparent from consideration of the drawings, is within the cell 49, that is the surface 61 is above the top of the columns 51. The upper silage supporting surface 61 is preferably inclined downwardly and inwardly. Each wall 57 includes an inner edge 63 which is illustrated as being vertical; however, if desired, this inner edge may be slightly inclined. The walls 57 are also formed with a lower silage supporting surface 65 which is downwardly and inwardly inclined. I preferably space apart the innermost portions of the walls leaving an unobstructed area 67 on the base 55. A supporting block such as the block 11 of Fig. 1 may be used in this area if it is found useful with a particular type of silage being used.

When the cell 49 is filled with silage it will be understood that the silage is supported on the walls 57 upwardly spaced from the base 55 so that the cattle may get at it and also so the operator may have access to any compacted masses so they may be broken up. The silage will be supported on the walls in a way so that the equilibrium of the mass will be upset to thereby reduce intense pressure areas at the eating points, all as explained in connection with the form of my invention which is illustrated in Figs. 1 through 6 of the drawings.

Means, such as the plates 25 of Figs. 1 through 6 of the drawings, may be employed with the form of my invention as illustrated in Figs. 7 and 8 so that the eating action of the cattle may be controlled.

The mounting and operation of such plates will be the same as hereinabove described in connection with Figs. 1 through 6.

In this form of my invention, as in that illustrated in Figs. 1 through 6, it is to be distinctly understood that the angle, height and slope of the walls may be varied from those illustrated in the drawings and still fall within the spirit and scope of my invention.

I claim:

1. In a self feeder silo, in combination, a cylindrical storage cell for silage, a base upon which said cell is supported, said cell being provided with a plurality of feed openings in the lower part thereof, and means for supporting the major portion of the contained mass of silage above the base including a plurality of circumferentially spaced walls extending radially inwardly from the feed openings, the upper surfaces of some of said walls being of greater length than the upper surfaces of the other walls, the bases of said walls all being of equal length and said upper surfaces providing silage supporting surfaces.

2. In a self feeder silo, in combination, a cylindrical storage cell for silage, a base upon which said cell is supported, said cell being provided with a plurality of feed openings in the lower part thereof, and means for supporting the contained mass of silage above the base including a supporting element centrally positioned within the cell and a plurality of circumferentially spaced walls extending radially inwardly from adjacent the feed openings, said walls being of greater height than said supporting element and certain of said walls having downwardly and inwardly inclined inner edges and the remaining walls having vertically extending inner edges, and all of said walls being outwardly spaced relative to said supporting element providing an unobstructed area therebetween.

3. In a self feeder silo, in combination, a storage cell for silage, a base upon which said cell is supported, said cell being provided with a plurality of feed openings in the lower part thereof, and means permanently fixed within the self feeder silo for supporting a mass of silage contained within the cell in elevated position above the base in accessible position to an animal below the elevated mass of silage, said means including a plurality of spaced apart silage supporting members extending inwardly from adjacent the feed openings and said members being provided with upper substantially flat silage supporting surfaces, and the silage supporting members being of substantially less height than the height of the cell.

4. In a self feeder silo, in combination, a storage cell for silage, a base upon which said cell is supported, said cell being provided with a plurality of feed openings in the lower part thereof, and means for supporting a mass of silage contained within the cell in elevated position above the base in accessible position to an animal below the elevated mass of silage, said means including a plurality of spaced apart silage supporting members extending inwardly from adjacent the feed openings and said members being provided with upper substantially horizontally extending silage supporting surfaces, and the silage supporting members being of substantially less height than the height of the cell.

5. In a self feeder silo, in combination, a cylindrical storage cell for silage, a base upon which said cell is supported, said cell being provided with a plurality of feed openings in the lower part thereof, and means permanently fixed within the self feeder silo for supporting a mass of silage contained within the cell in elevated position above the base in accessible position to an animal below the elevated mass of silage, said means including a plurality of circumferentially and spacedly arranged silage supporting members mounted on said base and extending radially inwardly from adjacent the feed openings, said members being of less height than the height of the cell and being provided with upper silage supporting surfaces, and a further silage support element radially inwardly spaced from the inner ends of said silage supporting members, and said silage support element having a substantially flat silage supporting surface thereacross.

6. In a self feeder silo, in combination, a cylindrical storage cell for silage, a base upon which said cell is supported, said cell being provided with a plurality of feed openings in the lower part thereof, and means permanently fixed within the self feeder silo for supporting a mass of silage contained within the cell in elevated position above the base in accessible position to an animal below the elevated mass of silage, said means including a plurality of circumferentially and spacedly arranged silage supporting members mounted on said base and extending radially inwardly from adjacent the feed openings, said members being of less height than the height of the cell and being provided with upper silage supporting surfaces, and a further silage support element radially inwardly spaced from the inner ends of said silage supporting members, said support element having a substantially flat silage supporting surface thereacross, and said supporting members being of greater height than said support element.

7. In a self feeder silo, in combination, a cylindrical storage cell for silage, a base upon which said cell is supported, said cell being provided with a plurality of feed openings in the lower part thereof, and means permanently fixed within the self feeder silo for supporting a mass of silage contained within the cell in elevated position above the base in accessible position to an animal below the elevated mass of silage, said means including a plurality of circumferentially and spacedly arranged silage supporting members mounted on said base and extending inwardly from adjacent the feed openings and said members being provided with upper substantially flat and horizontally extending silage supporting surfaces, and a further silage support element mounted on said base in position radially inwardly spaced from the inner ends of said silage supporting members, and said silage supporting members being of greater height than said support element.

References Cited in the file of this patent

UNITED STATES PATENTS

| | | |
|---|---|---|
| 1,228,929 | Johnson | June 5, 1917 |
| 1,301,051 | Hart | Apr. 15, 1919 |
| 1,822,289 | Helmers | Sept. 8, 1931 |
| 2,365,862 | Bufton | Dec. 26, 1944 |
| 2,638,871 | Ruedemann | May 19, 1953 |